(12) United States Patent (10) Patent No.: US 8,185,570 B2
Fukumura et al. (45) Date of Patent: May 22, 2012

(54) THREE-TERM INPUT FLOATING-POINT ADDER-SUBTRACTOR

(75) Inventors: Yusuke Fukumura, Sagamihara (JP); Patrick Hamilton, Machida (JP); Masaya Nakahata, Sagamihara (JP); Takashi Oomori, Hadano (JP)

(73) Assignee: Hitachi, Ltd., Tokyo (JP)

( * ) Notice: Subject to any disclaimer, the term of this patent is extended or adjusted under 35 U.S.C. 154(b) by 1128 days.

(21) Appl. No.: 11/955,571

(22) Filed: Dec. 13, 2007

(65) Prior Publication Data

US 2008/0215660 A1 Sep. 4, 2008

(30) Foreign Application Priority Data

Dec. 14, 2006 (JP) .................................. 2006-337252

(51) Int. Cl.
*G06F 7/42* (2006.01)
*G06F 7/50* (2006.01)
*G06F 11/00* (2006.01)
(52) U.S. Cl. .................... 708/505; 708/709; 708/530
(58) Field of Classification Search ........... 708/670–714
See application file for complete search history.

(56) References Cited

U.S. PATENT DOCUMENTS

| 4,754,422 | A | * | 6/1988 | Sakai et al. | 708/650 |
|---|---|---|---|---|---|
| 4,761,757 | A | * | 8/1988 | Sakai et al. | 708/650 |
| 5,299,319 | A | * | 3/1994 | Vassiliadis et al. | 712/221 |
| 5,359,548 | A | * | 10/1994 | Yoshizawa et al. | 708/505 |
| 5,880,984 | A | * | 3/1999 | Burchfiel et al. | 708/501 |
| 5,954,790 | A | * | 9/1999 | Wong | 708/505 |
| 6,085,211 | A | * | 7/2000 | Yoshioka | 708/505 |
| 6,298,367 | B1 | * | 10/2001 | Oberman et al. | 708/524 |
| 6,571,267 | B1 | * | 5/2003 | Yoshioka | 708/505 |
| 6,895,423 | B2 | * | 5/2005 | Kawata | 708/501 |
| 7,428,566 | B2 | * | 9/2008 | Siu et al. | 708/501 |
| 7,546,328 | B2 | * | 6/2009 | Schulte et al. | 708/505 |
| 2002/0083109 | A1 | * | 6/2002 | Willson et al. | 708/700 |
| 2002/0129075 | A1 | * | 9/2002 | Park et al. | 708/505 |
| 2004/0267861 | A1 | * | 12/2004 | Gerwig et al. | 708/670 |
| 2005/0210094 | A1 | * | 9/2005 | Purcell | 708/670 |
| 2006/0122817 | A1 | * | 6/2006 | Baumgartner et al. | 703/14 |
| 2006/0136543 | A1 | * | 6/2006 | Lutz et al. | 708/670 |

FOREIGN PATENT DOCUMENTS

JP 09-204294 8/1997

OTHER PUBLICATIONS

Tenca, "Multi-operand Floating-point Addition," Proc. 19th IEEE Intl. Symp. Computer Arithmetic (ARITH-19 '09), pp. 161-168, Jun. 2009.*

* cited by examiner

*Primary Examiner* — Lewis A Bullock, Jr.
*Assistant Examiner* — Matthew Sandifer
(74) *Attorney, Agent, or Firm* — Antonelli, Terry, Stout & Kraus, LLP.

(57) ABSTRACT

The adder-subtractor includes a pre-processing circuit which divides three inputted terms into a mantissa having an exponent of maximum value, mantissa having an exponent of intermediate value and mantissa having an exponent of minimum magnitude and outputting a mantissa obtained by right-shifting the mantissa having the exponent of intermediate value and the mantissa having the minimum exponent of 2n+3 bits and adjusting digits and the mantissa having the maximum exponent, which reduces the mantissas from three to two terms, which carries out addition on the mantissas of the two terms, a normalization circuit which makes left shift so that the most significant bit becomes 1, a rounding circuit which uses an (n+3)th bit from the most significant bit as a new sticky bit, takes logical OR with the lower bits and performs rounding and an exponent operation unit which outputs a final exponent.

4 Claims, 20 Drawing Sheets

FIG. 4B

| a_ex-b_ex_sign | a_ex-c_ex_sign | b_ex-c_ex_sign | a=b? | a=-c? | b=-c? | large_sign | large_ex | large_man | medium_sign | large_ex-medium_ex | medium_man | small_sign | large_ex-small_ex | small_man |
|---|---|---|---|---|---|---|---|---|---|---|---|---|---|---|
| 0 | 0 | 0 | 0 | 0 | 0 | a_sign | a_ex | a_man | b_sign | a_ex-b_ex | b_man | c_sign | a_ex-c_ex | c_man |
| 0 | 0 | 1 | 0 | 0 | 0 | a_sign | a_ex | a_man | c_sign | a_ex-c_ex | c_man | b_sign | a_ex-b_ex | b_man |
| 0 | 1 | 0 | 0 | 0 | 0 | / | / | / | / | / | / | / | / | / |
| 0 | 1 | 1 | 0 | 0 | 0 | c_sign | c_ex | c_man | a_sign | c_ex-a_ex | a_man | b_sign | c_ex-b_ex | b_man |
| 1 | 0 | 0 | 0 | 0 | 0 | b_sign | b_ex | b_man | a_sign | b_ex-a_ex | a_man | c_sign | b_ex-c_ex | c_man |
| 1 | 0 | 1 | 0 | 0 | 0 | / | / | / | / | / | / | / | / | / |
| 1 | 1 | 0 | 0 | 0 | 0 | c_sign | c_ex | c_man | b_sign | c_ex-b_ex | b_man | a_sign | c_ex-a_ex | a_man |
| 1 | 1 | 1 | 0 | 0 | 1 | a_sign | a_ex | a_man | b_sign | a_ex-b_ex | b_man | 0 | 0 | 0 |
| * | * | * | 0 | 1 | 0 | b_sign | b_ex | b_man | a_sign | b_ex-a_ex | a_man | 0 | 0 | 0 |
| * | * | * | 1 | 0 | 0 | a_sign | a_ex | a_man | c_sign | a_ex-c_ex | c_man | 0 | 0 | 0 |
| * | * | * | 1 | 0 | 1 | c_sign | c_ex | c_man | a_sign | c_ex-a_ex | a_man | 0 | 0 | 0 |
| * | * | * | 1 | 1 | 0 | a_sign | a_ex | a_man | b_sign | a_ex-b_ex | b_man | 0 | 0 | 0 |
| * | * | * | 1 | 1 | 1 | 0 | 0 | 0 | 0 | 0 | 0 | 0 | 0 | 0 |

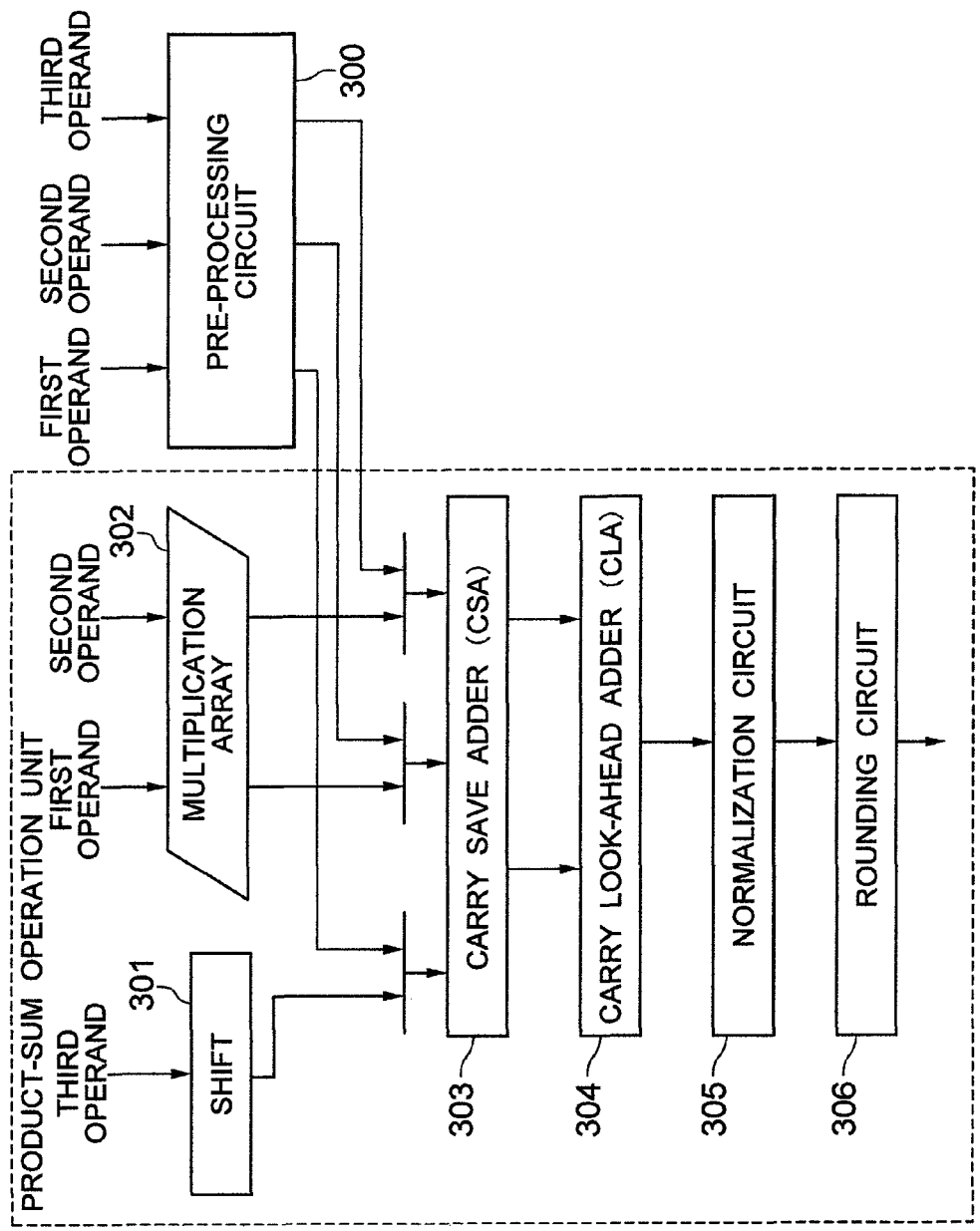

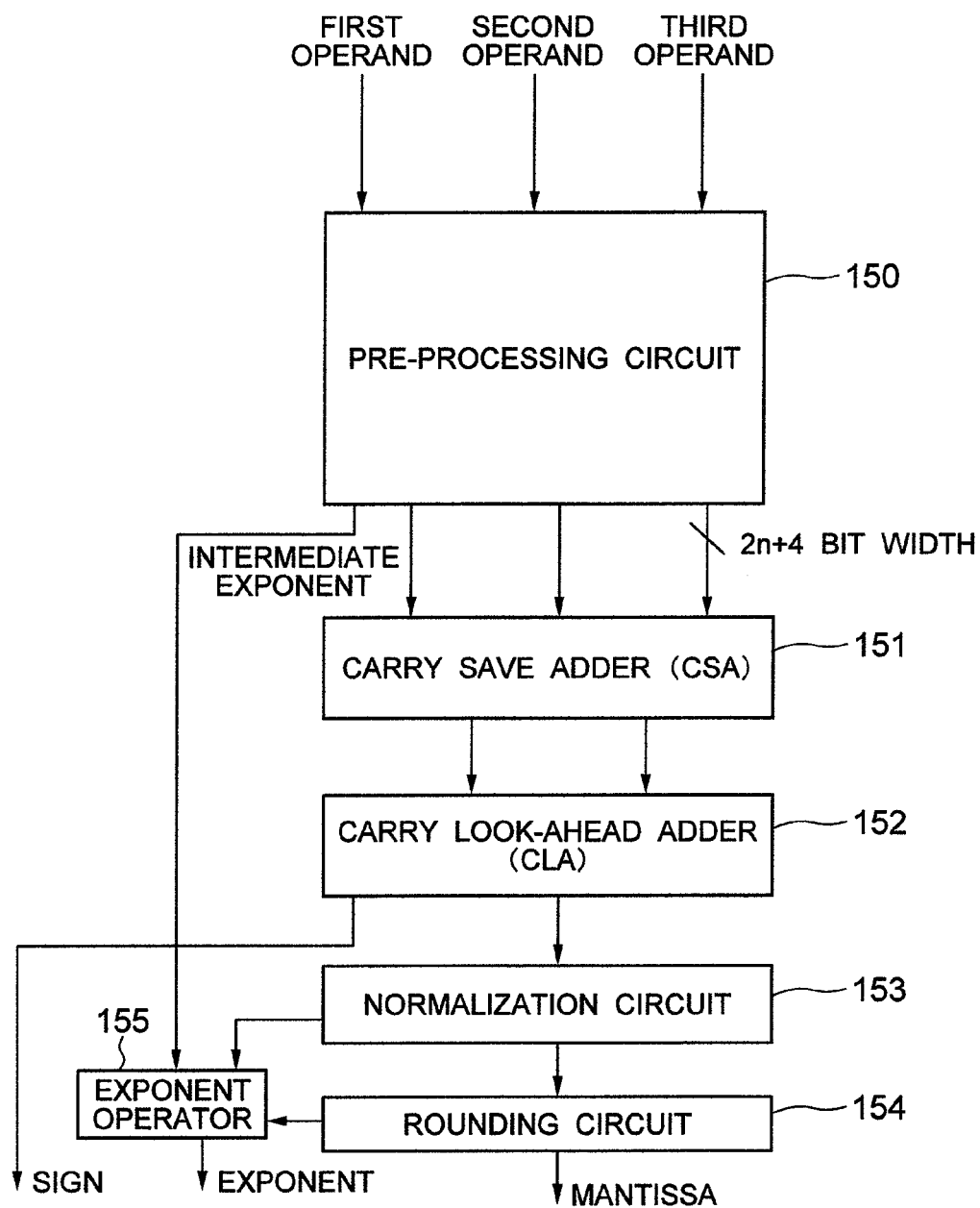

FIG. 7B

| a_ex-b_ex_sign | a_ex-c_ex_sign | b_ex-c_ex_sign | a=b? | a=c? | b=c? | large_sign | large_ex | large_man | medium_sign | large_ex-medium_ex | medium_man | small_sign | large_ex-small_ex | medium_ex-small_ex | small_man |
|---|---|---|---|---|---|---|---|---|---|---|---|---|---|---|---|
| 0 | 0 | 0 | 0 | 0 | 0 | a_sign | a_ex | a_man | b_sign | a_ex-b_ex | b_man | c_sign | a_ex-c_ex | b_ex-c_ex | c_man |
| 0 | 0 | 1 | 0 | 0 | 0 | a_sign | a_ex | a_man | c_sign | a_ex-c_ex | c_man | b_sign | a_ex-b_ex | c_ex-b_ex | b_man |
| 0 | 1 | 0 | 0 | 0 | 0 | / | / | / | / | / | / | / | / | / | / |
| 0 | 1 | 1 | 0 | 0 | 0 | c_sign | c_ex | c_man | a_sign | c_ex-a_ex | a_man | b_sign | c_ex-b_ex | a_ex-b_ex | b_man |
| 1 | 0 | 0 | 0 | 0 | 0 | b_sign | b_ex | b_man | a_sign | b_ex-a_ex | a_man | c_sign | b_ex-c_ex | a_ex-c_ex | c_man |
| 1 | 0 | 1 | 0 | 0 | 0 | / | / | / | / | / | / | / | / | / | / |
| 1 | 1 | 0 | 0 | 0 | 0 | c_sign | c_ex | c_man | b_sign | c_ex-b_ex | b_man | a_sign | c_ex-a_ex | b_ex-a_ex | a_man |
| 1 | 1 | 1 | 0 | 0 | 0 | a_sign | a_ex | a_man | b_sign | a_ex-b_ex | b_man | a_sign | b_ex-a_ex | c_ex-a_ex | a_man |
| * | * | * | 0 | 1 | 0 | b_sign | b_ex | b_man | 0 | 0 | 0 | 0 | 0 | 0 | 0 |
| * | * | * | 1 | 0 | 0 | a_sign | a_ex | a_man | 0 | 0 | 0 | 0 | 0 | 0 | 0 |
| * | * | * | 1 | 0 | 1 | c_sign | c_ex | c_man | 0 | 0 | 0 | 0 | 0 | 0 | 0 |
| * | * | * | 1 | 1 | 0 | a_sign | a_ex | a_man | 0 | 0 | 0 | 0 | 0 | 0 | 0 |
| * | * | * | 1 | 1 | 1 | b_sign | b_ex | b_man | 0 | 0 | 0 | 0 | 0 | 0 | 0 |
| * | * | * | 1 | 1 | 1 | 0 | 0 | 0 | 0 | 0 | 0 | 0 | 0 | 0 | 0 |

FIG. 9B

| a_ex-b_ex_sign | a_ex-c_ex_sign | b_ex-c_ex_sign | a=-b? | a=-c? | b=-c? | large_sign | large_ex | large_man | medium_sign | large_ex-medium_ex | medium_man | small_sign | large_ex-small_ex | small_man |
|---|---|---|---|---|---|---|---|---|---|---|---|---|---|---|
| 0 | 0 | 0 | 0 | 0 | 0 | a_sign | a_ex | a_man | b_sign | a_ex-b_ex | b_man | c_sign | a_ex-c_ex | c_man |
| 0 | 0 | 1 | 0 | 0 | 0 | a_sign | a_ex | a_man | c_sign | a_ex-c_ex | c_man | b_sign | a_ex-b_ex | b_man |
| 0 | 1 | 0 | 0 | 0 | 0 | | | | | | | | | |
| 0 | 1 | 1 | 0 | 0 | 0 | c_sign | c_ex | c_man | b_sign | c_ex-b_ex | b_man | b_sign | c_ex-b_ex | b_man |
| 1 | 0 | 0 | 0 | 0 | 0 | b_sign | b_ex | b_man | a_sign | | a_man | c_sign | b_ex-c_ex | c_man |
| 1 | 0 | 1 | 0 | 0 | 0 | | | | | | | | | |
| 1 | 1 | 0 | 0 | 0 | 0 | c_sign | c_ex | c_man | a_sign | c_ex-a_ex | a_man | b_sign | c_ex-a_ex | a_man |
| 1 | 1 | 1 | 0 | 0 | 1 | a_sign | a_ex | a_man | c_sign | | c_man | a_sign | b_ex-a_ex | a_man |
| * | * | * | 0 | 1 | 0 | b_sign | b_ex | b_man | a_sign | b_ex-a_ex | a_man | a_sign | c_ex-a_ex | a_man |
| * | * | * | 1 | 0 | 0 | a_sign | a_ex | a_man | b_sign | | b_man | 0 | 0 | 0 |
| * | * | * | 1 | 0 | 1 | c_sign | c_ex | c_man | a_sign | | a_man | 0 | 0 | 0 |
| * | * | * | 1 | 1 | 0 | a_sign | a_ex | a_man | c_sign | | c_man | 0 | 0 | 0 |
| * | * | * | 1 | 1 | 1 | b_sign | b_ex | b_man | 0 | 0 | 0 | 0 | 0 | 0 |
| * | * | * | 1 | 1 | 1 | 0 | 0 | 0 | 0 | 0 | 0 | 0 | 0 | 0 |

FIG. 9C

| ROUNDING MODE | large_sign | s_sign | ROUNDING METHOD |
|---|---|---|---|
| RN | * | * | large_man |
| RZ | 0 | 0 | large_man |
| | 0 | 1 | large_man−1 |
| | 1 | 0 | large_man−1 |
| | 1 | 1 | large_man |
| RP | 0 | 0 | large_man+1 |
| | 0 | 1 | large_man |
| | 1 | 0 | large_man−1 |
| | 1 | 1 | large_man |
| RM | 0 | 0 | large_man |
| | 0 | 1 | large_man−1 |
| | 1 | 0 | large_man |
| | 1 | 1 | large_man+1 |

FIG. 11B

| a_ex-b_ex_sign | a_ex-c_ex_sign | b_ex-c_ex_sign | a=-b? | a=-c? | b=-c? | large_sign | large_ex | large_man | medium_sign | medium_man | small_sign | medium_ex-small_ex | small_man |
|---|---|---|---|---|---|---|---|---|---|---|---|---|---|
| 0 | 0 | 0 | 0 | 0 | 0 | a_sign | a_ex | a_man | b_sign | b_man | c_sign | b_ex-c_ex | c_man |
| 0 | 0 | 1 | 0 | 0 | 0 | a_sign | a_ex | a_man | c_sign | c_man | b_sign | c_ex-b_ex | b_man |
| 0 | 1 | 0 | 0 | 0 | 0 | / | / | / | / | / | / | / | / |
| 0 | 1 | 1 | 0 | 0 | 0 | c_sign | c_ex | c_man | a_sign | a_man | b_sign | a_ex-b_ex | b_man |
| 1 | 0 | 0 | 0 | 0 | 0 | b_sign | b_ex | b_man | a_sign | a_man | c_sign | a_ex-c_ex | c_man |
| 1 | 0 | 1 | 0 | 0 | 0 | / | / | / | / | / | / | / | / |
| 1 | 1 | 0 | 0 | 0 | 0 | c_sign | c_ex | c_man | b_sign | b_man | a_sign | c_ex-a_ex | a_man |
| 1 | 1 | 1 | 0 | 0 | 1 | b_sign | b_ex | b_man | c_sign | c_man | a_sign | b_ex-a_ex | a_man |
| * | * | * | 0 | 1 | 0 | a_sign | a_ex | a_man | 0 | 0 | 0 | 0 | 0 |
| * | * | * | 0 | 1 | 1 | b_sign | b_ex | b_man | 0 | 0 | 0 | 0 | 0 |
| * | * | * | 1 | 0 | 0 | a_sign | a_ex | a_man | 0 | 0 | 0 | 0 | 0 |
| * | * | * | 1 | 0 | 1 | c_sign | c_ex | c_man | 0 | 0 | 0 | 0 | 0 |
| * | * | * | 1 | 1 | 0 | b_sign | b_ex | b_man | 0 | 0 | 0 | 0 | 0 |
| * | * | * | 1 | 1 | 1 | 0 | 0 | 0 | 0 | 0 | 0 | 0 | 0 |

FIG. 12A  PRIOR ART
MANTISSA OF FIRST OPERAND    1 x x x x x x ... x
MANTISSA OF SECOND OPERAND  1 x x x x x x ... x
FIG. 12B  PRIOR ART
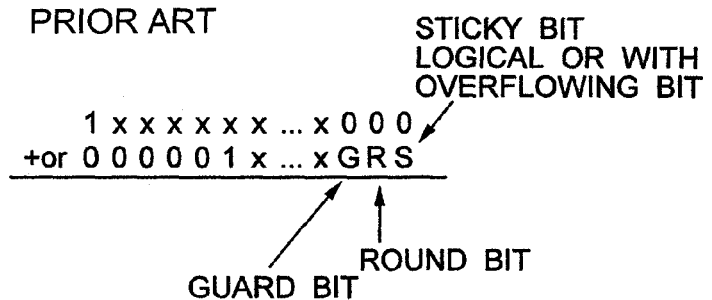
FIG. 12C  PRIOR ART
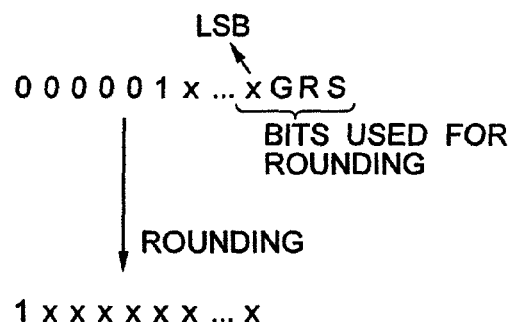

FIG. 13  PRIOR ART

| ROUNDING MODE | SIGN | LSB | GUARD | ROUND | STICKY | ROUNDING UP / ROUNDING DOWN |
|---|---|---|---|---|---|---|
| RN | x | x | 0 | x | x | ROUNDING DOWN |
|  | x | x | 1 | 1 | x | ROUNDING UP |
|  | x | x | 1 | 0 | 1 | ROUNDING UP |
|  | x | 1 | 1 | 0 | 0 | ROUNDING UP |
|  | x | 0 | 1 | 0 | 0 | ROUNDING DOWN |
| RZ | x | x | x | x | x | ROUNDING DOWN |
| RP | 1 | x | x | x | x | ROUNDING DOWN |
|  | 0 | x | 1 | 1 | x | ROUNDING UP |
|  | 0 | x | 0 | 1 | x | ROUNDING UP |
|  | 0 | x | 0 | 0 | 1 | ROUNDING UP |
|  | 0 | x | 0 | 0 | 0 | ROUNDING DOWN |
| RM | 1 | x | 1 | 1 | x | ROUNDING UP |
|  | 1 | x | 0 | 1 | x | ROUNDING UP |
|  | 1 | x | 0 | 0 | 1 | ROUNDING UP |
|  | 1 | x | 0 | 0 | 0 | ROUNDING DOWN |

FIG. 14  PRIOR ART

KNUTH'S FORMULA
TO CALCULATE
PRECISE x+y WITH
FLOATING-POINT
NUMBERS x, y s=fl(x+y);
ya=fl(s-x);
xa=fl(s-ya);
dy=fl(y-ya);
dx=fl(x-xa);
d=fl(dx-dy);

→ WHEN THREE-TERM INPUT FLOATING-POINT ADDITION AND SUBTRACTION IS USED s=fl(x+y);
d=fl(x+y-s);

fl() REPRESENTS FLOATING-POINT OPERATION PRECISE SUM IS INDICATED WITH s AND d

FIG. 15

```
a  + 1 x x x x x x ... x 0 0 0 ⎫ CANCELING
b  - 1 x x x x x x ... x 0 0 0 ⎭ OUT
c  + 0 0 0 0 0 1 x ... x G R S
``` c IS RIGHT-SHIFTED AND INFORMATION NECESSARY FOR PRECISE RESULT IS LOST

FIG. 16

```
a  + 1 x x x x x x ... x 0 0 0  ⎫ LOSS OF SIGNIFICANT
b  - 1 x x x x x x ... x 0 0 0  ⎬ DIGITS
c  + 0 0 0 0 0 1 x ... x G R S
``` c IS RIGHT-SHIFTED AND
INFORMATION NECESSARY FOR
PRECISE RESULT IS LOST

FIG. 17

```
a  + 1 x x x x x x ... x 0 0 0   ⎫ BOTH b AND c
b  - 0 0 0 0 0 1 x ... x G R S   ⎬ PRODUCE BIT
c  + 0 0 0 0 0 1 x ... x G R S   ⎭ OVERFLOW
```

OPERATION BETWEEN
STICKY BITS

THREE-TERM INPUT FLOATING-POINT ADDER-SUBTRACTOR

BACKGROUND OF THE INVENTION

1. Field of the Invention

The present invention relates to a floating-point adder-subtractor with inputs of three terms, and more particularly, to a three-term input floating-point adder-subtractor capable of obtaining the same result as that obtained when an operation is carried out with infinite precision in an operation process and followed by rounding.

2. Description of the Related Art

Today, floating-point operation is used for scientific and technological calculations and graphic processing or the like, and therefore many microprocessors incorporate a floating-point operation unit. Among these operations, addition and subtraction are basic operations and binary operation units which carry out operation on two inputs are generally used.

Floating-point operations are defined by IEEE754 which is a standard, and are used widely. The IEEE standard requires that addition and subtraction with inputs of two terms should be treated as if having infinite precision in an operation process and then rounded in accordance with the standard. A method of carrying out operation by adding three bits of a guard bit, round bit and sticky bit to lower digits of a mantissa is known as a general method for realizing infinite precision in an operation process using an operation unit having only a finite bit width and is described, for example, in Milos D. Ercegovac "Digital Arithmetic".

FIG. 12 illustrates states of mantissas in a binary operation process defined by the standard IEEE754.

Now, suppose the mantissas of a first operand and second operand before an operation are as shown in FIG. 12($a$). "x" shown in all drawings of the present invention which will be explained hereinafter is an arbitrary value of 0 or 1. In a binary operation, a difference in exponents between two terms of the aforementioned first operand and second operand is calculated and the larger exponent is assumed to be an exponent of intermediate value in that case. The mantissa of the operand corresponding to the smaller exponent is right-shifted by the difference in exponents between the aforementioned two terms. In that case, as is conventionally well known, a right shift is made after adding three bits of a guard bit, round bit and sticky bit to the lower digits of the mantissa in order to enable rounding to be done precisely. However, suppose the sticky bit is a logical OR with all discarded bits. In this case, the mantissas of the aforementioned two terms are as shown in FIG. 12($b$).

Next, an operation is carried out using a binary adder-subtractor on the above described right-shifted bit sequence and the bit sequence having the larger exponent. The result of this addition and subtraction is left-shifted until the most significant bit (MSB) becomes 1 and then normalized. Furthermore, the exponent of intermediate value is updated at the same time. Next, rounding is performed in a rounding mode compliant with the IEEE standard. The mantissa obtained by left-shifting the result of addition and subtraction until the most significant bit (MSB) becomes 1 and normalizing the result and the mantissa resulting from rounding are as shown in FIG. 12($c$).

In the case of a binary operation, carrying out the above described addition and subtraction can obtain the same result as that when carrying out operations with infinite precision in a calculation process and then rounding.

FIG. 13 illustrates methods of rounding modes compliant with the IEEE standard. The IEEE754 defines four types of rounding mode of RN (nearest value), RZ (zero direction), RP (+infinity direction) and RM (−infinity direction). FIG. 13 shows a relationship between the sign of a result of binary addition, values of least significant bit (LSB), guard bit, round bit and sticky bit of a mantissa, rounding up and rounding down as a way of rounding in each rounding mode. Since these are well known contents, further explanations thereof will be omitted here.

In contrast to the above described addition and subtraction operation with inputs of two terms, addition and subtraction operation with inputs of three terms (1) can enhance, in a case of processing of carrying out multiple additions such as computing the sum total of certain vectors, the speed of processing by adding three terms rather two terms at a time and (2) while Knuth's formula for calculating the sum of two floating-points with no errors (see Donald E. Knuth "The Art of Computer Programming: Seminumerical Algorithms (Vol 2, 3rd Ed)") requires six floating-point additions and subtractions, if three-term input floating-point addition can be used, only two floating-point additions and subtractions are enough and there is an advantage of being able to enhance the speed of multiple-precision operation which makes heavy use of such operations.

FIG. 14 illustrates how two-term input operation and three-term input operation are carried out to calculate the sum x+y of floating-point numbers x and y with no errors according to Knuth's formula. Operation using an operation unit with inputs of two terms requires six floating-point additions and subtractions. On the other hand, carrying out the same operation using an operation unit with inputs of three terms requires only two floating-point additions and subtractions.

However, in comparison with the two-term input operation, using the three-term input operation makes it difficult to obtain a precise result in floating-point addition and subtraction. Here, the "precise result" refers to producing the same result as that when an operation is carried out with infinite precision and then rounding is performed in an operation process.

Next, a case where a precise result cannot be obtained when a two-term operation method is expanded to a three-term operation just as is will be explained. In the following explanations, suppose the first operand of three-term input is a, the second operand is b and the third operand is c.

FIG. 15 illustrates an example where a precise result cannot be obtained because two out of three terms cancel out each other.

Suppose a case where two out of three terms cancel out each other in an operation, for example, a case where a=−b, |a|, |b|>|c|. In this case, since a and b cancel out each other, the correct result should be c. However, since the absolute value of c is smaller than a and b as shown in FIG. 15, the shifted and discarded bits are summarized in the sticky bits, which causes information necessary for the precise result to be lost, and therefore a precise result cannot be obtained by simply extending the calculation method of an operation with two terms to an operation with three terms just as is.

FIG. 16 illustrates an example where loss of significant digits in an operation with two out of three terms having large absolute values prevents a precise result from being obtained.

For example, suppose a case where a≈−b, |a|, |b|>|c|. Loss of significant digits occurs in an operation with a and b. As shown in FIG. 16, since the absolute value of c is smaller than a and b, the shifted and discarded bits are summarized in the sticky bits losing information necessary for the precise result, and therefore a precise result cannot be obtained by simply extending the calculation method of an operation with two terms to an operation with three terms just as is.

The example explained using FIG. 15 can be regarded as a special case of the example explained using FIG. 16, but the example shown in FIG. 15 results in a+b=0, and therefore the result must become c in a precise sense irrespective of the magnitude of the absolute value of c and all the bits of c are required. On the other hand, in the case of the example shown in FIG. 16, all the bits of c are not always necessary depending on the magnitude of the absolute value of c, and therefore the example shown in FIG. 15 and the example shown in FIG. 16 are treated as separate cases.

FIG. 17 illustrates an example where two out of three terms produce bit discards due to a shift, preventing a precise result from being obtained. The example explained here assumes that |a|>>|b|, |c|.

As shown in FIG. 17, a shift of both b and c produces a bit overflow and the discarded bits are grouped in the sticky bits. In this case, an operation is carried out between sticky bits and the operation may propagate to higher digits, preventing a precise result from being obtained. Even when the operation does not propagate to higher digits, information on the magnitude relationship between |b| and |c| is lost when |b|≈|c| or the like and rounding cannot be performed correctly in rounding modes of RZ (zero direction), RP (+infinity direction) and RM (−infinity direction) defined by the IEEE754 standard.

A technique descried in JP-A 9-204294 or the like is known as a prior art relating to a three-term input floating-point operation unit. This prior art provides a gap bit between a round bit and sticky bit to prevent propagation of carries to higher digits due to addition between sticky bits. However, when two out of three terms cancel out each other as described in FIG. 15 and when loss of significant digits occurs in an operation on two out of three terms having large absolute values as described in FIG. 16, precise results cannot be obtained. Furthermore, in the case of the example explained in FIG. 17 where two out of three terms produce bit discarded due to a shift, preventing a precise result from being obtained, there may be no problem when the rounding mode is RN (nearest value), but in the case of other rounding modes, the problem cannot be solved completely and it is not possible to obtain the same result as that when rounding is carried out after an operation is carried out with infinite precision in the operation process.

As described above, in the case of a three-term input operation, there is a problem that applying the method of binary operation just as is makes it difficult to obtain a precise result in floating-point addition and subtraction.

It is an object of the present invention to provide a three-term input floating-point adder-subtractor capable of solving the above described problems of the prior art and obtaining, even in cases where it is difficult to precisely carry out three-term input floating-point addition and subtraction, the same result as that when rounding is performed after an operation is carried out with infinite precision in the operation process.

SUMMARY OF THE INVENTION

According to the present invention, the above described object can be attained by a three-term input floating-point adder-subtractor including cancellation detection means for detecting that two out of three terms cancel out each other in an operation, selection means for outputting, when the cancellation detection means detects that two terms cancel out each other, the remaining one term as a result, digit adjusting means for making a digit adjusting shift with a width of 2n+3 bits where n is a bit width of a mantissa and using a least significant bit as a sticky bit, addition and subtraction means for carrying out addition and subtraction on three terms with the bit width, and rounding means for normalizing the result and carrying out rounding in an RN (nearest value) mode using an (n+3)th bit from the highest digit as a new sticky bit.

Furthermore, the above described object can be attained by a three-term input floating-point adder-subtractor including cancellation detection means for detecting that two out of three terms cancel out each other in an operation, selection means for outputting, when the cancellation detection means detects that two terms cancel out each other, the remaining one term as a result, digit adjusting means for making a digit adjusting shift with a width of 2n+4 bits where n is a bit width of mantissa and using a least significant bit as a sticky bit, bit discard detection means for detecting a case where two out of three terms produce bit discarded due to a shift as a result of the digit adjusting shift, digit adjusting means for setting, when a bit discarded is detected from an output of the bit discard detection means, the amount of shift to n+4 for a mantissa having an exponent of intermediate value and to the sum of n+4 and a difference in exponents between the two terms for a mantissa having a minimum exponent, addition and subtraction means for carrying out addition and subtraction on the three terms with the bit width, and rounding means for normalizing the result and carrying out rounding in any one of rounding modes of RN (nearest value), RZ (zero direction), RP (+infinity direction) and RM (−infinity direction) modes using an (n+3)th bit from the highest digit as a new sticky bit.

According to the present invention, it is possible to carry out three-term input floating-point addition and subtraction so as to obtain the same result as that when rounding is carried out after an operation is carried out with infinite precision in an operation process.

BRIEF DESCRIPTION OF THE DRAWINGS

FIG. 4B is a truth table showing a relationship between inputs and outputs of the selector included in the pre-processing circuit in FIG. 3;

FIG. 5 is a block diagram showing the circuit configuration of an operation circuit which enables both a product-sum operation and addition and subtraction to be carried out using the pre-processing circuit shown in FIG. 4A;

FIG. 6 is a block diagram showing the configuration of a three-term input floating-point adder-subtractor according to a second embodiment of the present invention;

FIG. 7B shows a truth table showing a relationship between inputs and outputs of the selector included in the pre-processing circuit in FIG. 6;

FIG. 9B shows a truth table showing a relationship between inputs and outputs of the selector included in the pre-processing circuit in FIG. 8;

FIG. 9C illustrates processing of the rounding circuit included in the pre-processing circuit in FIG. 8;

FIG. 11B shows a truth table showing a relationship between inputs and outputs of the selector included in the pre-processing circuit in FIG. 10;

FIGS. 12A, 12B and 12C illustrate states of mantissas in an operation process of a binary operation defined by the IEEE754 standard;

FIG. 13 illustrates methods of rounding modes compliant with the IEEE standard;

FIG. 14 illustrates how two-term input operation and three-term input operation are carried out to calculate the sum x+y of floating-point numbers x and y with no errors according to Knuth's formula;

FIG. 15 illustrates an example where two out of three terms cancel out each other, preventing a precise result from being obtained;

FIG. 16 illustrates an example where loss of significant digits occurs in two out of three terms having large absolute values, preventing a precise result from being obtained; and FIG. 17 illustrates an example where two out of three terms produce bit discarded due to a shift, preventing a precise result from being obtained.

DETAILED DESCRIPTION OF THE INVENTION

Hereinafter, embodiments of a three-term input floating-point adder-subtractor according to the present invention will be explained, but solutions by the present invention will be explained briefly first. In the explanations below, suppose a first operand with inputs of three terms is a, a second operand is b and a third operand is c.

(1) Solution when Two Out of Three Terms Cancel Out Each Other (FIG. 15)

In this case, the problem can be solved by checking cases where cancellation occurs (a=−b, a=−c, b=−c) using a comparator before carrying out addition so that the result becomes c when a=−b, the result becomes b when a=−c and the result becomes a when b=−c.

(2) Solution when Loss of Significant Digits Occurs in Two Out of Three Terms Having Larger Absolute Values (FIG. 16)

Figure 1:
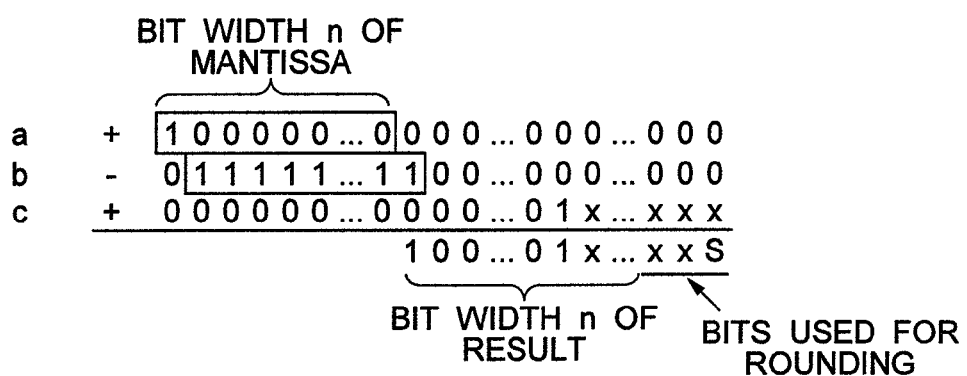
FIG. 1 illustrates a solution to a case where loss of significant digits occurs in two out of three terms having large absolute values (FIG. 16)

FIG. 1 illustrates a solution when loss of significant digits occurs in two out of three terms having larger absolute values (FIG. 16).

The problem in this case can be solved by causing the bit width of addition and subtraction to become 2n+3 bits or more where the bit width of the mantissa part of each term is assumed to be n bits (including 1 of the most significant bit). This will be explained considering a case where loss of significant digits occurs most. When considering a case where loss of significant digits occurs in an operation on a and b, it is when both a and b are positive, subtraction is carried out from a and b, the mantissa of a=10000 . . . 0, mantissa of b=11111 . . . 1, (exponent of a)−(exponent of b)=1 that loss of significant digits occurs most. As shown in FIG. 1, when loss of significant digits occurs in operations on a and b, the effective digits of the result are n bits from the least significant bit of b. Furthermore, since 3 bits are further required for rounding, the bit width of addition and subtraction can be set to 2n+3 bits or more. This allows also rounding to be carried out using the same method as that of a binary operation.

(3) Solution when Two Out of Three Terms Produce Bit Overflows Due to a Shift (FIG. 17)

There can be three solutions and they will be explained below as solutions A, B and C.

Solution A

FIG. 2 illustrates solution A when two out of three terms produce bit discarded due to a shift.

Figure 2A:
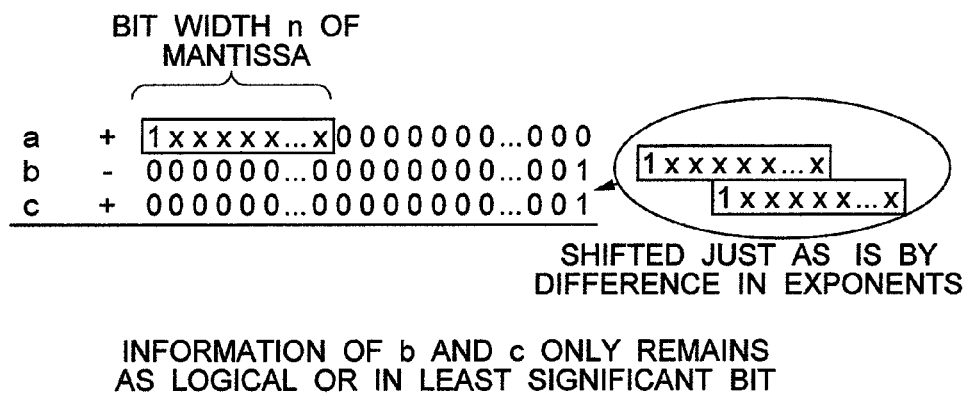
FIGS. 2A and 2B illustrate solution A when two out of three terms produce bit discarded due to a shift.

Solution A is a solution that when the bit width of addition and subtraction is 2n+4 bits and two terms produce bit discarded due to a shift, the amount of shift of the mantissa having an exponent of intermediate value is set to n+4 and the amount of shift of the mantissa of a minimum exponent is set to the sum of n+4 and the difference in exponents between the two terms. An example of this case will be explained using FIG. 2 assuming |a|>|b|>|c|. As shown in FIG. 2(a), suppose a case where b and c are simply shifted by the difference in exponents. In this case, the pieces of information of b and c are all grouped under sticky bits and when b and c have different signs, sticky bits cancel out each other and the magnitude relation between b and c is lost. As a result, rounding cannot be performed correctly in rounding modes of RZ (zero direction), RP (+infinity direction) and RM (−infinity direction).

Figure 2B:
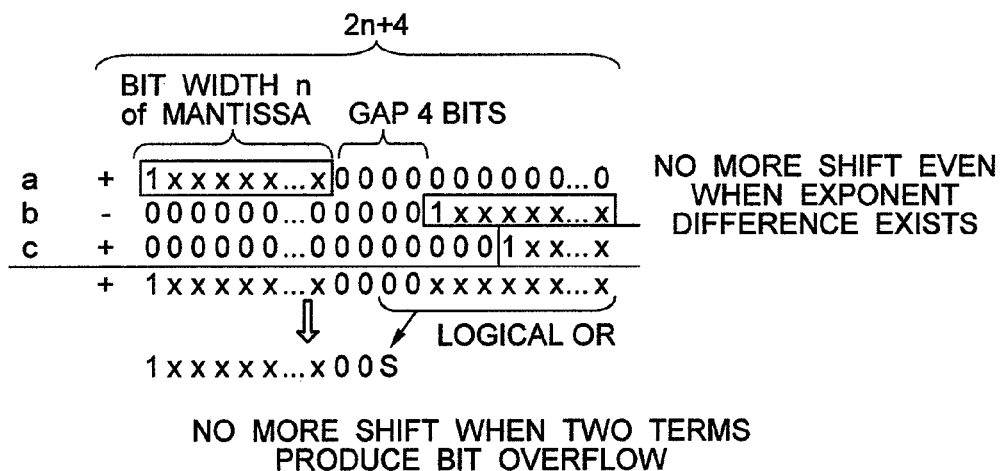

On the other hand, when two terms produce bit discarded due to a shift, if the amount of shift for the mantissa having an exponent of intermediate value is set to n+4 and the amount of shift for the mantissa having a minimum exponent is set to the sum of n+4 and difference in exponents between the two terms, then as shown in FIG. 2(b), by carrying out addition and subtraction, and then normalization, and regarding the (n+3)th bit from the most significant bit as a new sticky bit, it is possible to obtain the same result as that when the operation is carried out with infinite accuracy, normalized and the (n+3)th bit is regarded as a new sticky bit and it is possible to carry out rounding correctly as a consequence.

As in the example shown in FIG. 2(b), the reason that 4 bits are necessary for gap bits between the effective digits of a and the effective digits of b and c is that there is a possibility that the effective digits of a may be reduced by one digit due to addition and subtraction to/from b and c and there is also a possibility that a carry of one digit may occur due to addition and subtraction to/from b and c, and since there are 4 gap bits, operation is carried out by keeping the state before rounding with infinite precision whatever the input, producing the same result as that when the third digit from the least significant bit of the resulting bit position is regarded as a sticky bit.

Solution B

Solution B is a solution whereby a magnitude relation in absolute values between two terms producing bit discarded due to a shift is detected so that rounding can be performed correctly. In the case of the solution when loss of significant digits occurs in two out of three terms having large absolute values if the bit width of addition and subtraction is 2n+3 bits, the information on discarded bits when the two out of three terms produce bit overflows due to a shift has no influence on the mantissa of the intermediate result and only the information necessary for rounding is lost. Therefore, a correct result can be obtained by determining a magnitude relation (sign of the sum of two terms) in absolute values between two terms producing bit discarded using a comparator and carry out rounding based thereon. This is solution B.

Solution C

Solution C is a solution whereby two terms having small absolute values are detected before addition, the two terms are shifted with a bit width of 2n+3 bits, which is the solution when loss of significant digits occurs in two out of three terms, addition and subtraction are carried out on the terms, the result thereof is not subjected to rounding, addition to the remaining one term is carried out with a bit width of 2n+3 bits and rounding is performed finally.

Next, a specific circuit example of the three-term input floating-point adder-subtractor according to embodiments of the present invention will be explained in detail with reference to drawings.

Figure 3:
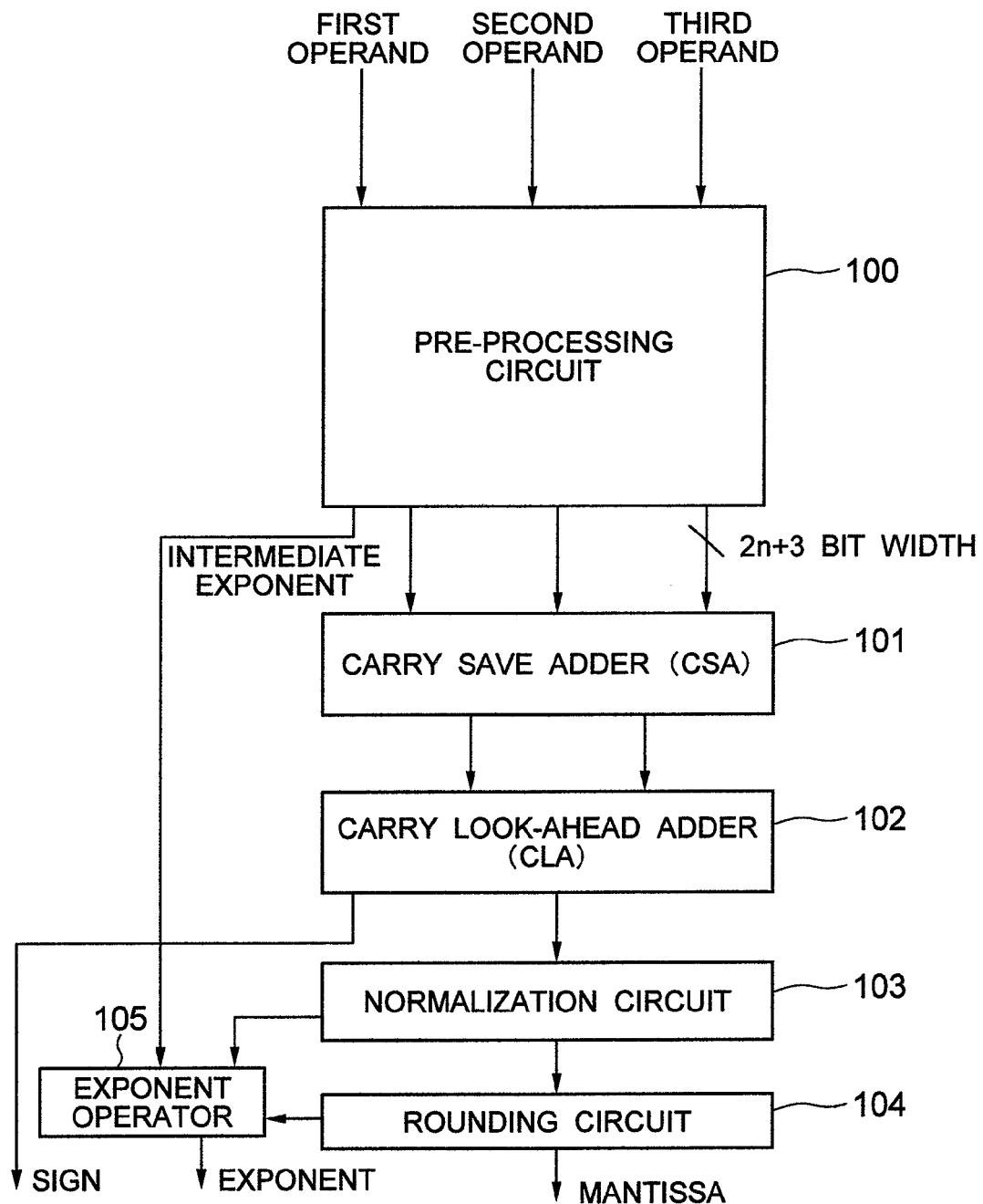
FIG. 3 is a block diagram showing the configuration of a three-term input floating-point adder-subtractor according to a first embodiment of the present invention.

FIG. 3 is a block diagram showing the configuration of a three-term input floating-point adder-subtractor according to a first embodiment of the present invention. The three-term input floating-point adder-subtractor shown in FIG. 3 is configured by adopting the solutions explained in (1) and (2) above and it is possible to obtain the same result as that when rounding is performed after carrying out an operation with infinite precision only when the rounding mode is RN (nearest value), but there may be cases where correct results cannot be obtained when the rounding mode is other than RN (nearest value).

The three-term input floating-point adder-subtractor shown in FIG. 3 is constructed of a pre-processing circuit 100, carry save adder (CSA) 101, carry look-ahead adder (CLA) 102, normalization circuit 103, rounding circuit 104 and exponent operation unit 105.

The pre-processing circuit 100 divides first to third operands inputted to a mantissa having an exponent of maximum value, mantissa having an exponent of intermediate value and mantissa having an exponent of minimum magnitude, outputs mantissas obtained by right-shifting the mantissa having the exponent of intermediate value and mantissa having the minimum exponent with a width of 2n+3 bits and adjusting digits, outputs the mantissa having the maximum exponent and outputs the maximum exponent as the exponent of intermediate value.

The carry save adder (CSA) 101 carries out an operation of reducing the mantissa having a 2n+3 bit width from the pre-processing circuit 100 from three terms to two terms. Furthermore, the carry look-ahead adder (CLA) 102 carries out addition of the mantissas of the two terms, changes, when the addition result becomes negative, the result to an expression in absolute values. The normalization circuit 103 then makes a left shift so that the most significant bit becomes 1. The rounding circuit 104 uses the (n+3)th bit from the most significant bit as a new sticky bit, takes logical OR with the lower bits and then performs rounding in an RN (nearest value) mode. The rounding algorithm may be completely the same as that in the case of binary addition. The exponent operation unit 105 updates the exponent from the results of the normalization circuit 103 and rounding circuit 104 and the exponent of intermediate value and outputs a final exponent.

Figure 4A:
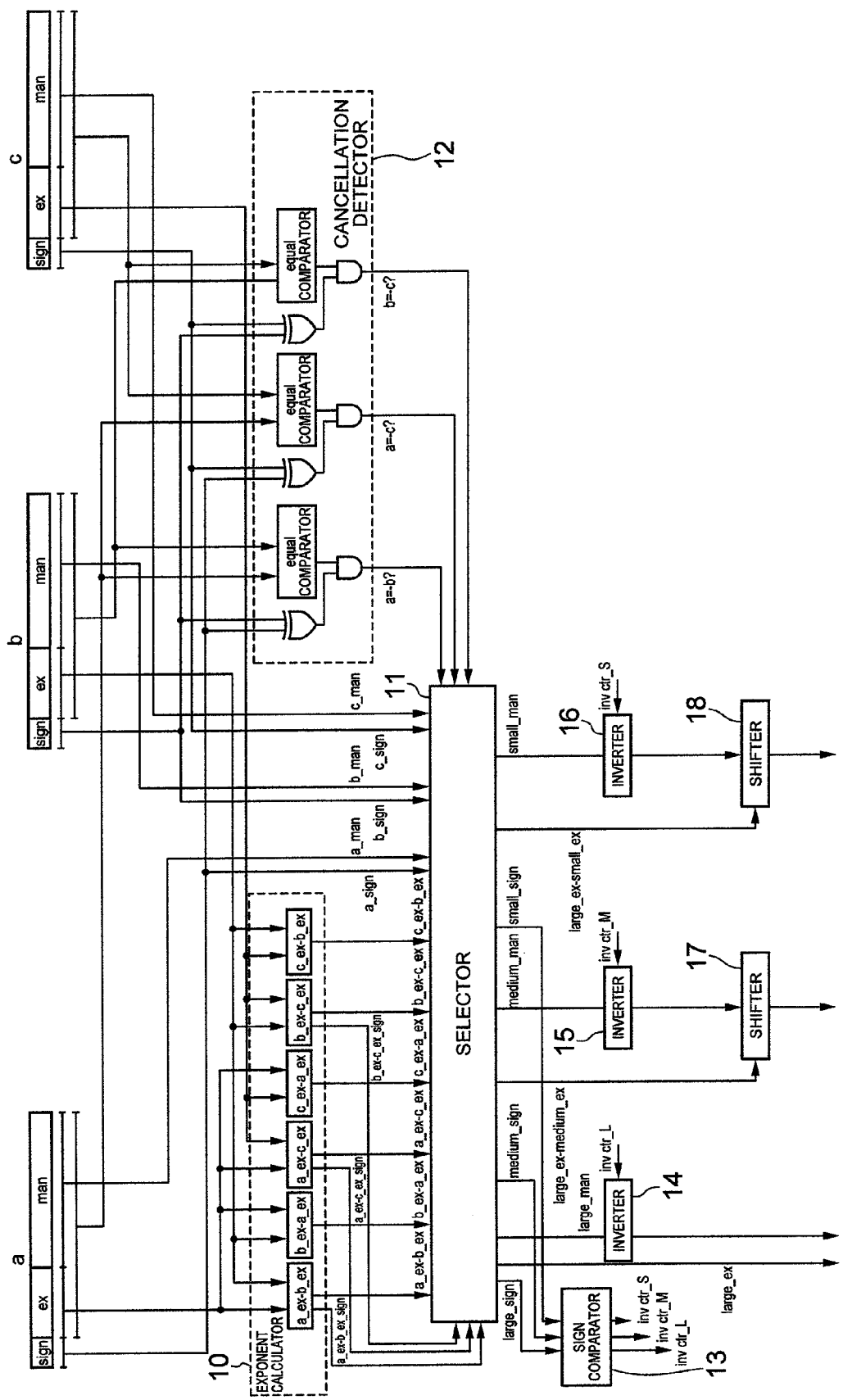
FIG. 4A is a block diagram showing the circuit configuration of the pre-processing circuit in FIG. 3.

FIG. 4A is a block diagram showing the circuit configuration of the pre-processing circuit 100 and FIG. 4B shows a truth table showing a relationship between inputs and outputs of the selector included in the pre-processing circuit 100.

The pre-processing circuit 100 performs pre-processing to carry out addition and subtraction and is constructed of an exponent calculator 10, selector 11, cancellation detector 12, sign comparator 13, inverters 14 to 16 and shifters 17, 18 as shown in FIG. 4A. The pre-processing circuit 100 receives data of first to third operands a to c made up of a sign "sign", exponent "ex" and mantissa "man" respectively as input.

The exponent calculator 10 is provided with six operation units to calculate the differences in exponents of the respective inputs a to c and outputs the calculated exponent differences. The cancellation detector 12 is provided with three sets of a comparator and two gate circuits and detects cases where two out of three terms can cancel out each other using these sets.

The selector 11 is controlled with the information on the differences in exponents calculated by the exponent calculator 10 and the information indicating whether or not the cancellation detector 12 has detected cancellation in the operations on two out of three terms. The selector 11 then distributes mantissa large_man having the maximum exponent, mantissa medium_man having the exponent of intermediate value and mantissa small_man having the exponent of minimum magnitude from the differences in exponents obtained from the exponent calculator 10 to their respective outputs, outputs the differences (large_ex-small_ex, large_ex-medium_ex) from the maximum exponents which correspond to the amounts of shift to right-shift the mantissas of two terms other than the term having the maximum exponent and outputs the maximum exponent large-ex as the intermediate exponent.

Furthermore, when the cancellation detector 12 detects that two out of three terms cancel out each other, the selector 11 causes the mantissas of the two terms which cancel out each other to be outputted as 0 and causes the remaining one term to be outputted as the exponent of intermediate value.

Furthermore, FIG. 4B shows a truth table indicating a relationship between inputs and outputs of the selector 11 provided with the above described function, but explanations of this truth table will be omitted.

A sign comparator 13 compares the signs of three terms and decides whether or not 2's complement should be taken for the mantissa of each term. Taking 2's complement requires the bits of the mantissa to be inverted and 1 to be added thereto. The process of adding 1 normally uses a carry-in of the least significant bit of an adder. In the case of input of three terms, this process of adding 1 is considered to be a burden, but a maximum of one term that takes 2's complement is enough and when two out of three terms become negative, it is preferable to take 2's complement for positive terms, carry out addition processing and then finally invert the sign of the result. Furthermore, when all the three terms are negative, it is preferable to carry out addition processing without taking any 2's complements for all terms and invert the sign of the result finally. By so doing, it is possible to reduce the process of adding 1 when taking 2's complement to a maximum of one time. The sign comparator 13 decides for which term 2's complement should be taken.

Inverters 14, 15 and 16 are controlled with the information on the decision result by the aforementioned sign comparator 13 and carry out bit inversion to take the complement of each mantissa. Furthermore, shifters 17 and 18 right-shift the mantissa having the exponent of intermediate value and mantissa having the minimum exponent by the amount of shift determined as described above. The shift in this case is performed with a width of 2n+3 bits and the least significant bit becomes a sticky bit, and therefore it is ORed with the discarded bit. However, the term bit-inverted to take 2's complement is ANDed.

FIG. 5 is a block diagram showing the configuration of an operation circuit which enables both product-sum operation and addition and subtraction using the pre-processing circuit 100 shown in FIG. 4A.

As is normally well known, the three-term input product-sum operation unit is constructed of a shift circuit 301, multiplication array 302, carry save adder (CSA) 303, carry look-ahead adder (CLA) 304, normalization circuit 305 and rounding circuit 306. The portion which forms this product-sum operation unit and is made up of the carry save adder (CSA) 303, carry look-ahead adder (CLA) 304, normalization circuit 305, rounding circuit 306 has basically the same configuration as that of the portion of the first embodiment of the present invention explained using FIG. 3 except the pre-processing circuit 100.

For this reason, as shown in FIG. 5, it is possible to configure an operation circuit which enables both three-term input product-sum operation and three-term input addition and subtraction to be carried out by connecting the pre-processing circuit 100 in the first embodiment explained using FIG. 4A before the carry save adder (CSA) 303 of the three-term input product-sum operation unit. When both product-sum operation and addition and subtraction are necessary, this makes it possible to realize a low-cost operation circuit with the number of circuit parts making up the circuit reduced.

FIG. 6 is a block diagram showing the configuration of a three-term input floating-point adder-subtractor according to a second embodiment of the present invention. The three-term input floating-point adder-subtractor shown in FIG. 6 adopts the solutions explained (1) and (2) above, adopts solution A as the solution when two out of three terms produce bit discarded due to a shift and thereby enables all the problems to be solved. This second embodiment of the present invention makes it possible to obtain the same result as that when operations are carried out on all the four rounding modes in an operation process with infinite precision and then subjected to rounding.

The three-term input floating-point adder-subtractor shown in FIG. 6 is constructed of a pre-processing circuit 150, carry save adder (CSA) 151, carry look-ahead adder (CLA) 152, normalization circuit 153, rounding circuit 154 and exponent operation unit 155. The configuration and functions of the portion of this three-term input floating-point adder-subtractor except the pre-processing circuit 150 are the same as those in the case of the first embodiment explained using FIG. 3 except in that the operation bit width is set to 2n+4.

That is, the pre-processing circuit 150 divides the mantissas of the inputted first to third operands into a mantissa having an exponent of maximum value, mantissa having an exponent of intermediate value and mantissa having a minimum exponent, outputs a mantissa obtained by right-shifting the mantissa having the exponent of intermediate value and the mantissa having the minimum exponent with a width of 2n+4 bits and adjusting digits and the mantissa having the maximum exponent, and also outputs the maximum exponent as the intermediate exponent.

The carry save adder (CSA) 151 carries out an operation of reducing the mantissa from the pre-processing circuit 150 with a width of 2n+4 bits from three terms to two terms. Furthermore, the carry look-ahead adder (CLA) 152 carries out addition on the mantissas of two terms and changes, when the addition result becomes negative, the result to an expression in absolute values. The normalization circuit 153 then carries out a left shift so that the most significant bit becomes 1. Next, the rounding circuit 154 uses the (n+3)th bit from the most significant bit as a new sticky bit, takes logical OR with the lower bits and then performs rounding in any one of rounding modes of RN (nearest value), RZ (zero direction), RP (+infinity direction) and RM (−infinity direction) modes. The rounding algorithm may be completely the same as that in the case of binary addition. The exponent operation unit 155 updates the results of the normalization circuit 153 and rounding circuit 154 and the exponent from the intermediate exponent, and outputs a final exponent.

Figure 7A:
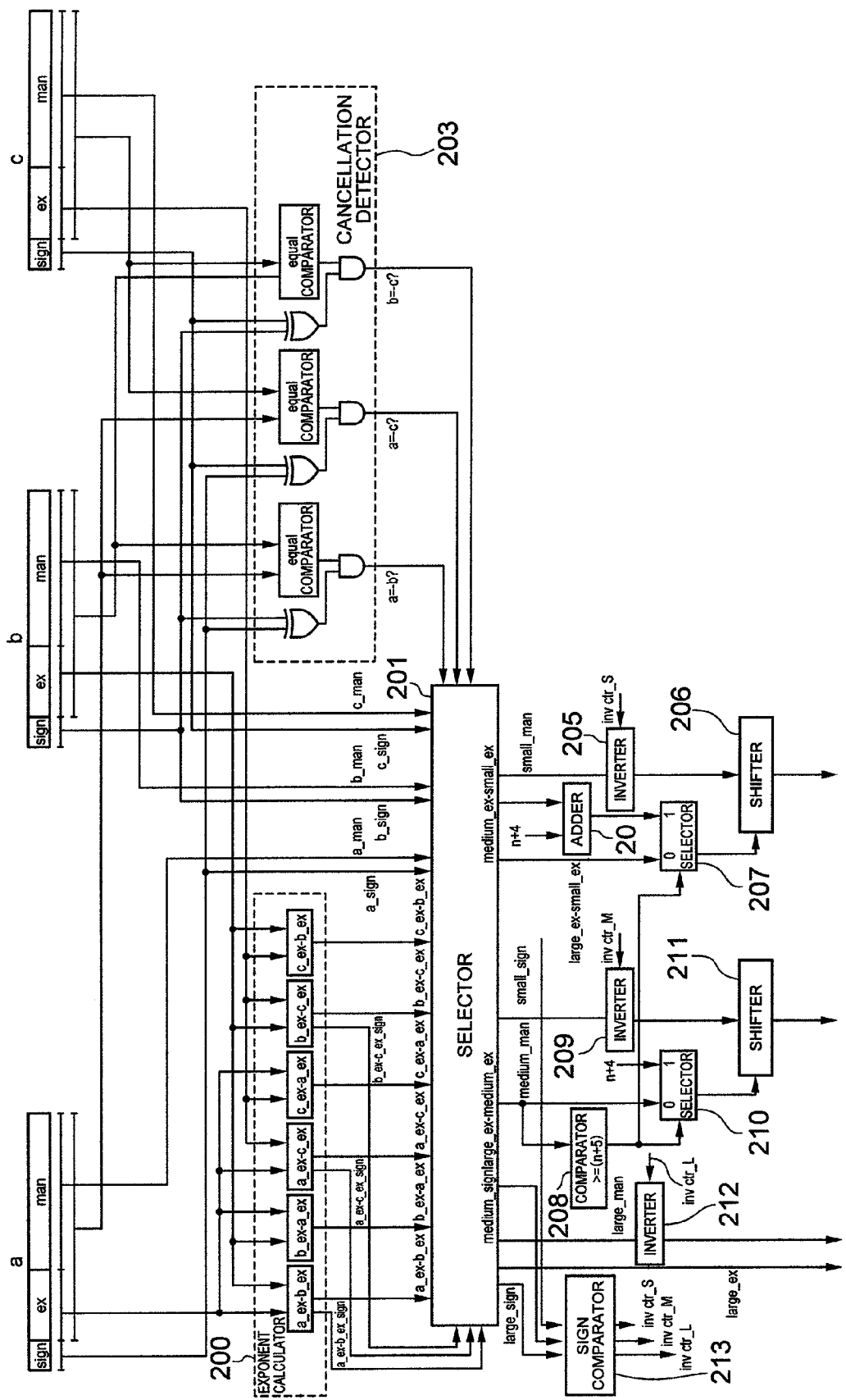
FIG. 7A is a block diagram showing the circuit configuration of the pre-processing circuit in FIG. 6.

FIG. 7A is a block diagram showing the circuit configuration of the pre-processing circuit 150 and FIG. 7B shows a truth table indicating a relationship between inputs and outputs of the selector included in the pre-processing circuit 150.

The pre-processing circuit 150 is intended to perform pre-processing for carrying out addition and subtraction and is constructed of, as shown in FIG. 7A, an exponent calculator 200, selector 201, cancellation detector 203, sign comparator 213, inverters 212, 209, 205, shifters 211, 206, adder 204, comparator 208 and selectors 210, 207. The pre-processing circuit 150 receives data of first to third operands a to c made up of sign "sign", exponent "ex" and mantissa "man" respectively as input.

The exponent calculator 200 is provided with six operation units to calculate the differences in exponents of inputs a to c and outputs the calculated exponent differences. The cancellation detector 203 is provided with three sets of a comparator and two gate circuits and detects cases where two out of three terms cancel out each other using these sets. The configuration and functions of these exponent calculator 200 and cancellation detector 203 are the same as those of the exponent calculator 10 and cancellation detector 12 shown in FIG. 4A.

The selector 201 is controlled with the information on the differences in exponents calculated by the exponent calculator 200 and the information indicating whether or not the cancellation detector 203 has detected cancellation in the operations on two out of three terms. The selector 201 then distributes mantissa large_man having the exponent of maximum value, mantissa medium_man having the exponent of intermediate value and mantissa small_man having the exponent of minimum magnitude from the differences in exponents obtained from the exponent calculator 200 to their respective outputs, outputs the differences in exponents (large_ex-small_ex, large_ex-medium_ex) which correspond to the amounts of shift to right-shift the mantissas of two terms other than the term having the maximum exponent and outputs the maximum exponent large-ex as the intermediate exponent.

Furthermore, when the cancellation detector 203 detects that two out of three terms cancel out each other, the selector 201 causes the mantissas of the two terms which cancel out each other to be outputted as 0 and causes the remaining one term to be outputted as the intermediate exponent.

FIG. 7B shows a truth table indicating a relationship between inputs and outputs of the selector 201 provided with the above described function, but explanations of this truth table will be omitted.

The sign comparator 213 compares the signs of three terms and decides whether or not 2's complement should be taken for the mantissa of each term. Taking 2's complement requires the bits of the mantissa to be inverted and 1 to be added thereto. The process of adding 1 normally uses a carry-in of the least significant bit of an adder. In the case of input of three terms, this process of adding 1 is considered to be a burden, but a maximum of one term that takes 2's complement is enough and when two out of three terms become negative, it is preferable to take 2's complement for positive terms, carry out addition processing and then finally invert the sign of the result. Furthermore, when all the three terms are negative, it is preferable to carry out addition processing without taking 2's complements for all the terms and invert the sign of the result finally. By so doing, it is possible to reduce the process of adding 1 when taking 2's complement to a maximum of one time. The sign comparator 213 decides for which term 2's complement should be taken.

Inverters 205, 209 and 212 are controlled with the information on the decision result by the aforementioned sign comparator 213 and carry out bit inversion to take the complement of each mantissa. The comparator 208 detects that the difference between the maximum exponent and the exponent of intermediate value is n+5 or more. Here, suppose n is the bit width of the mantissa. When a condition that the aforementioned difference is n+5 or more is established, two out of three terms produce bit discarded due to a shift. The selector 210 determines the amount of shift of the mantissa having the exponent of intermediate value. That is, when two out of three terms produce bit discarded due to a shift, the selector 210 outputs n+4 and outputs the difference from the maximum exponent otherwise. This output becomes the amount of shift of the mantissa having the exponent of intermediate value.

The adder 204 adds up the difference between the intermediate exponent and minimum exponent, and n+4. This addition result becomes the amount of shift of the mantissa having the minimum exponent when two out of three terms produce bit discarded due to a shift. The selector 207 determines the amount of shift of the mantissa having the minimum exponent. That is, when two out of three terms produce bit discarded due to a shift, the selector 207 selects the output of the aforementioned adder 204 and selects the difference between the maximum exponent and minimum exponent otherwise. The shifters 206 and 211 right-shift the mantissa having the exponent of intermediate value and the mantissa having the minimum exponent by the aforementioned determined amount of shift. The shift in this case is performed with a width of 2n+4 bits and the least significant bit becomes a sticky bit, and therefore it is ORed with the discarded bit. However, the term bit-inverted to take 2's complement is ANDed.

Figure 8:
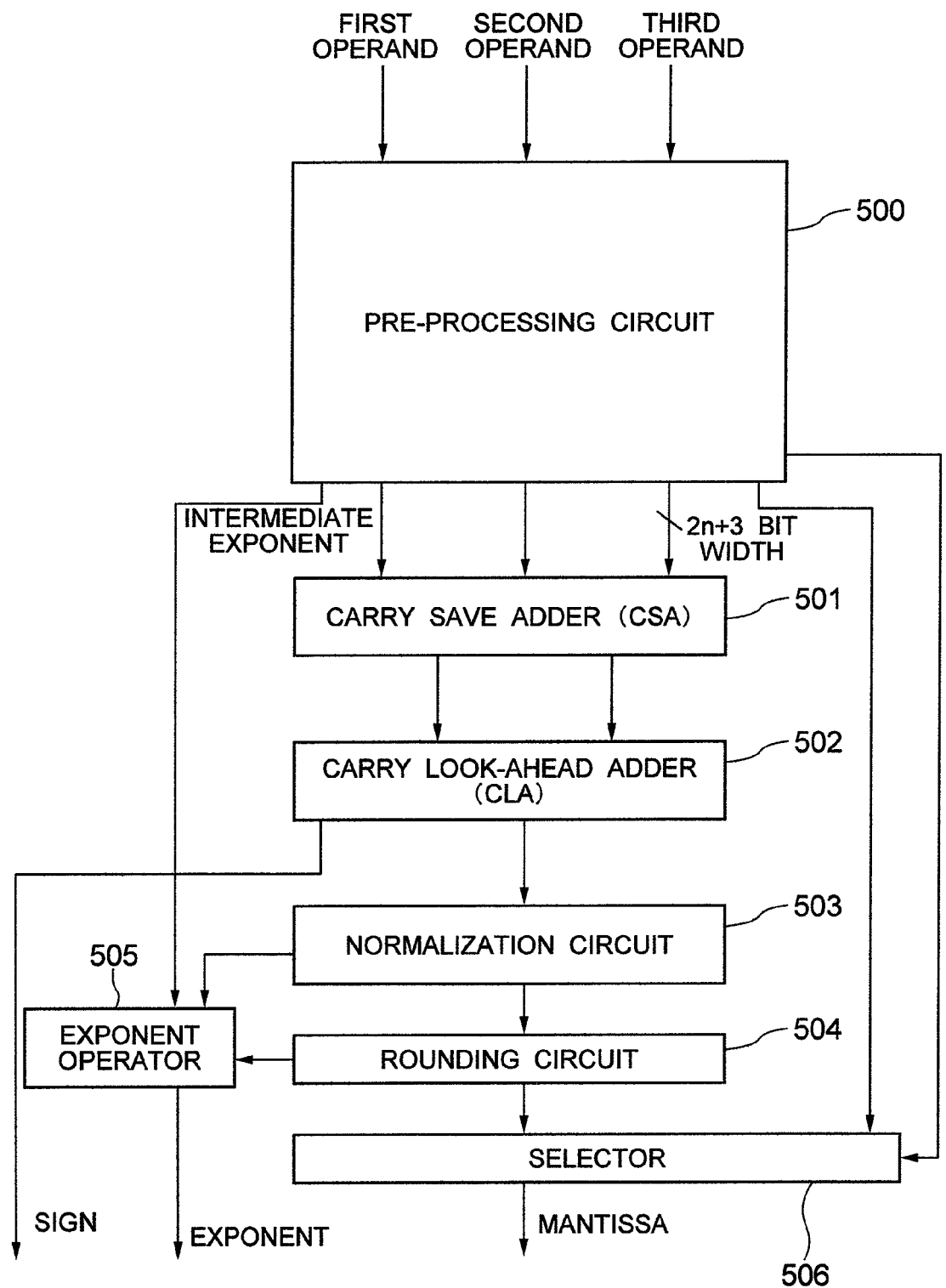
FIG. 8 is a block diagram showing the configuration of a three-term input floating-point adder-subtractor according to a third embodiment of the present invention.

FIG. 8 is a block diagram showing the configuration of a three-term input floating-point adder-subtractor according to a third embodiment of the present invention. The three-term input floating-point adder-subtractor shown in FIG. 8 adopts the solutions explained in (1) and (2) above, also adopts solution B as the solution when two out of three terms produce bit discarded due to a shift so as to be able to solve all the problems. According to this third embodiment of the present invention, it is possible to obtain the same result as that when an operation is carried out in all the four rounding modes with infinite precision in an operation process and rounding is then performed.

The three-term input floating-point adder-subtractor shown in FIG. 8 is constructed of a pre-processing circuit 500, carry save adder (CSA) 501, carry look-ahead adder (CLA) 502, normalization circuit 503, rounding circuit 504, exponent operation unit 505 and selector 506.

The pre-processing circuit 500 divides inputted first to third operands to a mantissa having an exponent of maximum value, mantissa having an exponent of intermediate value and mantissa having an exponent of minimum magnitude, outputs mantissas obtained by right-shifting the mantissa having the exponent of intermediate value and mantissa having the minimum exponent with a width of 2n+3 bits and adjusting digits, outputs the mantissa having the maximum exponent and outputs the maximum exponent as the exponent of intermediate value. Furthermore, the pre-processing circuit 500 outputs a signal indicating that the difference between the maximum exponent and intermediate exponent is n+4 or more and a signal indicating the result of rounding carried out inside the pre-processing circuit 500 and gives them to the selector 506.

The carry save adder (CSA) 501 carries out an operation of reducing the mantissa having a 2n+3 bit width from the pre-processing circuit 100 from three terms to two terms. Furthermore, the carry look-ahead adder (CLA) 502 carries out addition of the mantissa with two terms, changes, when the addition result becomes negative, the result to an expression in absolute values. The normalization circuit 503 then left-shifts it so that the most significant bit becomes 1. The rounding circuit 504 uses the (n+3)th bit from the most significant bit as a new sticky bit, takes logical OR with the lower bits and then performs rounding in any one of rounding modes of RN (nearest value), RZ (zero direction), RP (+infinite direction) and RM (−infinite direction) modes. The rounding algorithm may be completely the same as that in the case of binary addition. The exponent operation unit 505 updates the exponent from the results of the normalization circuit 503 and rounding circuit 504 and the intermediate exponent and outputs a final exponent. Furthermore, the selector 506 selects the mantissa result when two out of three terms produce bit discarded due to a shift and the mantissa result otherwise and outputs the final result.

Figure 9A:
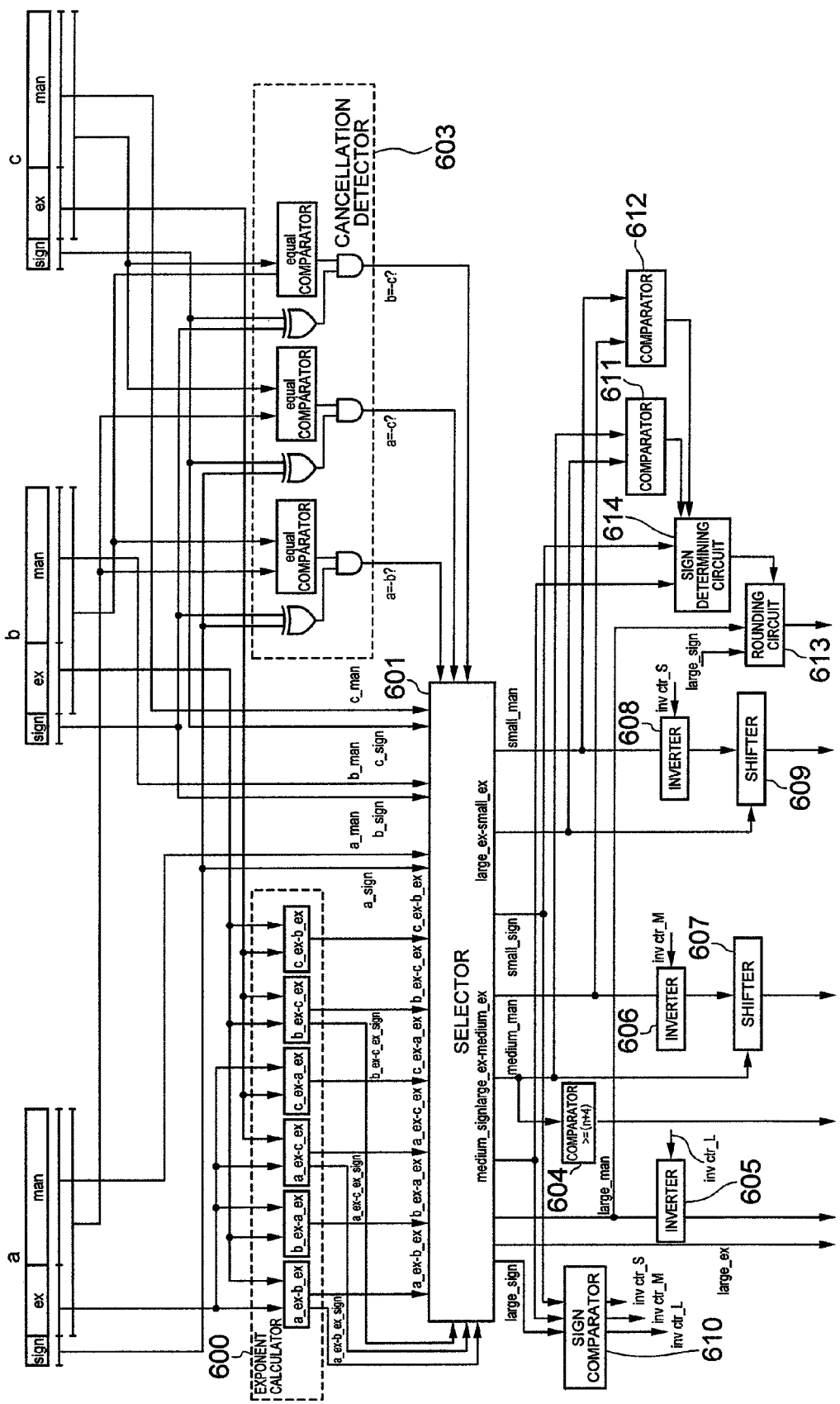
FIG. 9A is a block diagram showing the circuit configuration of the pre-processing circuit in FIG. 8.

FIG. 9A is a block diagram showing the circuit configuration of the pre-processing circuit 500 and FIG. 9B shows a truth table showing a relationship between inputs and outputs of the selector included in the pre-processing circuit 500.

The pre-processing circuit 500 performs pre-processing to carry out addition and subtraction and is constructed of an exponent calculator 600, selector 601, cancellation detector 603, sign comparator 610, inverters 605, 606, 608, shifters 607, 609, comparators 611, 612, rounding circuit 613 and sign determining circuit 614 as shown in FIG. 9A. The pre-processing circuit 500 receives data of first to third operands a to c made up of a sign "sign", exponent "ex" and mantissa "man" respectively as input.

The exponent calculator 600 is provided with six operation units to calculate the differences in exponents of inputs a to c and outputs the calculated exponent differences. The cancellation detector 603 is provided with three sets of a comparator and two gate circuits and detects cases where two out of three terms can cancel out each other using these sets. The configuration and functions of these exponent calculator 600 and cancellation detector 603 are the same as those of the exponent calculator 10, cancellation detector 12 shown in FIG. 4A.

The selector 601 is controlled with the information on the differences in exponents calculated by the exponent calculator 600 and the information indicating whether or not the cancellation detector 603 has detected cancellation in the operations on two out of three terms. The selector 601 then distributes mantissa large_man having the exponent of maximum value, mantissa medium_man having the exponent of intermediate value and mantissa small_man having the exponent of minimum magnitude from the differences in exponents obtained from the exponent calculator 600 to their respective outputs, outputs the differences (large_ex-small_ex, large_ex-medium_ex) from the maximum exponents which correspond to the amounts of shift to right-shift the mantissas of two terms other than the term having the maximum exponent and outputs the maximum exponent large-ex as the intermediate exponent.

Furthermore, when the cancellation detector 603 detects that two out of three terms cancel out each other, the selector 601 causes the mantissas of the two terms which cancel out each other to be outputted as 0 and causes the remaining one term to be outputted as the intermediate exponent.

FIG. 9B shows a truth table indicating a relationship between inputs and outputs of the selector 601 provided with the above described function, but explanations of this truth table will be omitted.

The sign comparator 610 compares the signs of three terms and decides whether or not 2's complement should be taken for the mantissa of each term. Taking 2's complement requires the bits of the mantissa to be inverted and 1 to be added thereto. The process of adding 1 normally uses a carry-in of the least significant bit of an adder. In the case of input of three terms, this process of adding 1 is considered to be a burden, but a maximum of one term that takes 2's complement is enough and when two out of three terms become negative, it is preferable to take 2's complement for positive terms, carry out addition processing and then finally invert the sign of the result. Furthermore, when all the three terms are negative, it is preferable to carry out addition processing without taking any 2's complement for all terms and then invert the sign of the result. By so doing, it is possible to reduce the process of adding 1 when taking 2's complement to a maximum of one time. The sign comparator 610 decides for which term 2's complement should be taken.

The inverters 605, 606, 608 are controlled with the information on the decision result by the aforementioned sign comparator 610 and carry out bit inversion to take the complement of each mantissa. The comparator 604 detects that the difference between the maximum exponent and the intermediate exponent is n+4 or more. Here, suppose n is the bit width of the mantissa. When a condition that the aforementioned exponent difference is n+4 or more is established, two out of three terms produce bit discarded due to a shift. When a condition that the aforementioned exponent difference is n+4 or more is established, the comparators 611, 612 decide a magnitude relation between the two terms which produce bit discarded due to a shift. The sign determining circuit 614 determines the sign of the sum of the two terms based on the decision results of the comparators 611, 612. The rounding circuit 613 performs rounding based on the sign of the determined sum of the two terms. The rounding method in this case is shown in FIG. 9C. The detection result of the aforementioned comparator 604 and the output of the rounding circuit 603 are given to the selector 506 and one of the output of the rounding circuit 603 and the output of the rounding circuit 504 is outputted from the selector 506 as the final result.

The shifters 607, 609 right-shift the mantissa having the exponent of intermediate value and mantissa having the minimum exponent by the amount of shift determined as described above. The shift in this case is performed with a width of 2n+3 bits and the least significant bit becomes a sticky bit, and therefore it is ORed with the discarded bit. However, the term bit-inverted to take 2's complement is ANDed.

Figure 10:
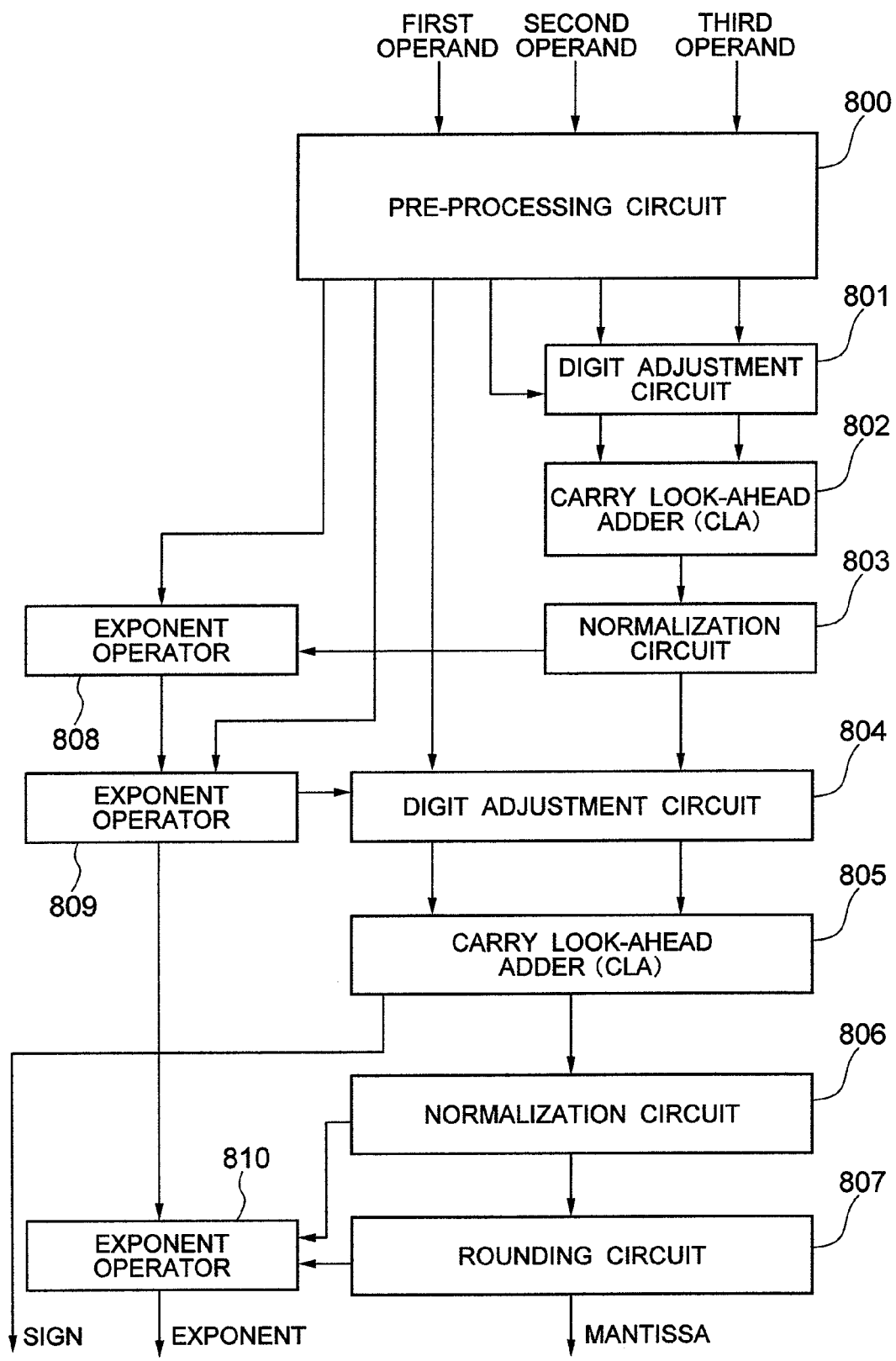
FIG. 10 is a block diagram showing the configuration of a three-term input floating-point adder-subtractor according to a fourth embodiment of the present invention.

FIG. 10 is a block diagram showing the configuration of a three-term input floating-point adder-subtractor according to a fourth embodiment of the present invention. The three-term input floating-point adder-subtractor shown in FIG. 10 adopts the solutions explained (1) and (2) above, adopts solution C as the solution when two out of three terms produce bit discarded due to a shift and thereby enables all the problems to be solved. This fourth embodiment of the present invention makes it possible to obtain the same result as that when operations are carried out on all the four rounding modes in an operation process with infinite precision and then subjected to rounding.

The three-term input floating-point adder-subtractor shown in FIG. 10 is constructed of a pre-processing circuit 800, digit adjustment circuit 801, carry look-ahead adder (CLA) 802, normalization circuit 803, digit adjustment circuit 804, carry look-ahead adder (CLA) 805, normalization circuit 806, rounding circuit 807 and exponent operation units 808 to 809.

The pre-processing circuit 500 divides the mantissas of the inputted first to third operands into a mantissa having an exponent of maximum value, mantissa having an exponent of intermediate value and mantissa having an exponent of minimum magnitude, and outputs the maximum exponent, intermediate exponent and difference between the intermediate exponent and the minimum exponent.

The digit adjustment circuit 801 makes a digit adjustment to carry out addition between the mantissa having the exponent of intermediate value and mantissa having the minimum exponent. The mantissa having the minimum exponent is right-shifted by the aforementioned exponent difference between the two terms. The shift in this case is made with a width of 2n+3 bits and the least significant bit becomes a sticky bit, and therefore it is ORed with the discarded bit. However, the term bit-inverted to take 2's complement is ANDed.

The carry look-ahead adder (CLA) 802 adds up mantissas of two terms and the normalization circuit 803 makes a left shift so that the most significant bit becomes 1. In this case, the exponent operation unit 808 updates the intermediate exponent. Rounding is not performed in this stage. The exponent operation unit 809 calculates the difference between the intermediate exponent and the maximum exponent updated above. The digit adjustment circuit 804 makes a digit adjustment to add up the aforementioned addition result and the mantissa having the maximum exponent. The mantissa having the smaller exponent is right-shifted by the aforementioned exponent difference. In this case, the shift is made with a width of 2n+3 bits and the least significant bit becomes a sticky bit, and therefore it is ORed with the discarded bit. The carry look-ahead adder (CLA) 805 adds up the mantissas of the two terms. The normalization circuit 806 makes a left shift so that the most significant bit becomes 1. The rounding circuit 807 uses the (n+3)th bit from the most significant bit as a new sticky bit and takes logical OR with the lower bits. The rounding circuit 807 then performs rounding in any one of rounding modes such as RN (nearest value), RZ (zero direction), RP (+infinity direction) and RM (−infinity direction) modes and outputs the final mantissa. The rounding algorithm in this case may be completely the same as that in the case of binary addition. The exponent operation unit 810 updates the exponents from the results of the normalization circuit 806 and rounding circuit 807 and outputs the final exponent.

Figure 11A:
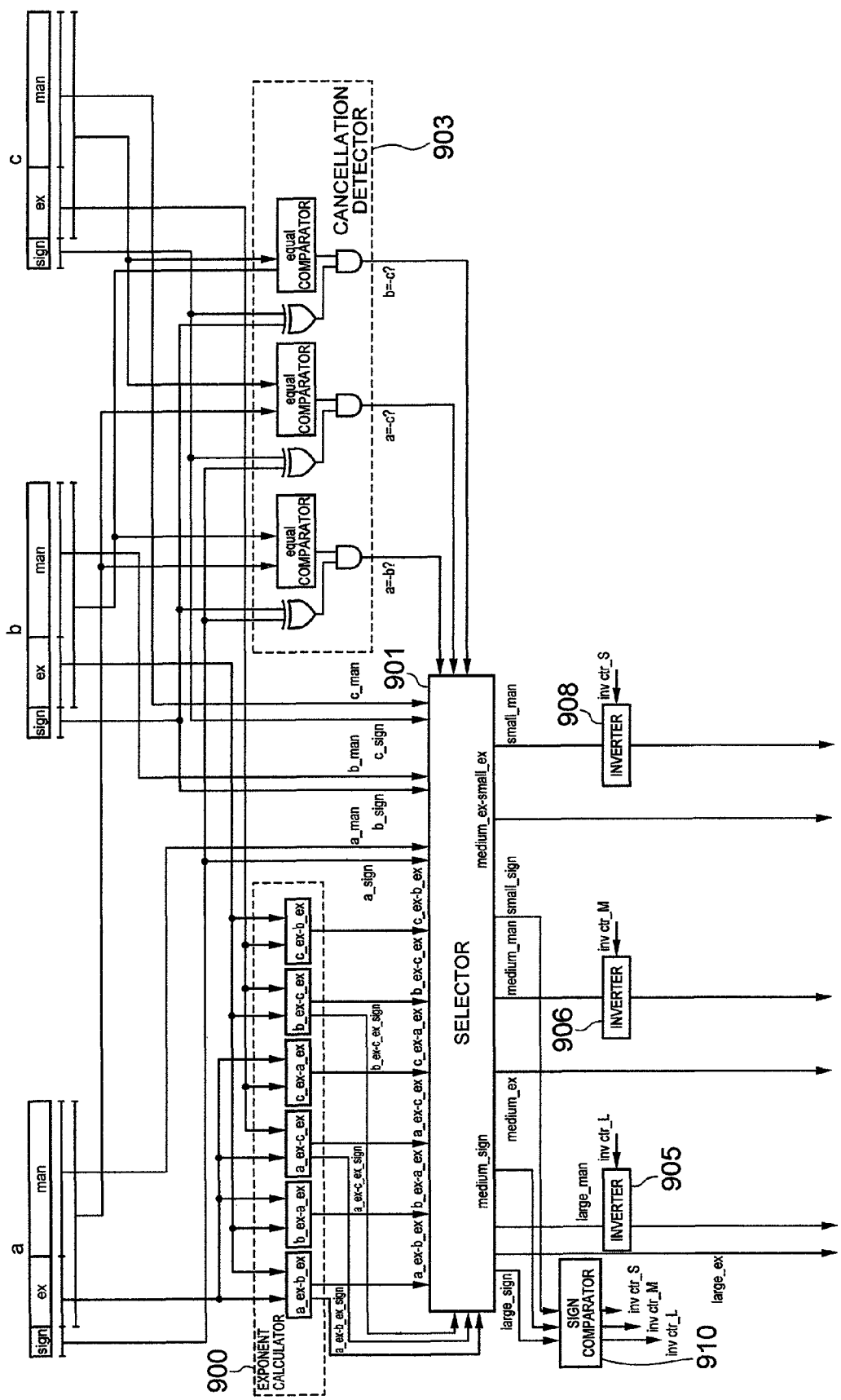
FIG. 11A is a block diagram showing the circuit configuration of the pre-processing circuit in FIG. 10.

FIG. 11A is a block diagram showing the circuit configuration of the pre-processing circuit 800 and FIG. 11B shows a truth table showing a relationship between inputs and outputs of the selector included in the pre-processing circuit 800.

The pre-processing circuit 800 performs pre-processing to carry out addition and subtraction and is constructed of an exponent calculator 900, selector 901, cancellation detector 903, sign comparator 910 and inverters 905, 906, 908 as shown in FIG. 11A. The pre-processing circuit 800 receives data of first to third operands a to c made up of a sign "sign", exponent "ex" and mantissa "man" respectively as input.

The exponent calculator 900 is provided with six operation units to calculate the differences in exponents of inputs a to c and outputs the calculated exponent differences. The cancellation detector 903 is provided with three sets of a comparator and two gate circuits and detects cases where two out of three terms can cancel out each other using these sets. The configuration and functions of these exponent calculator 900 and cancellation detector 903 are the same as those of the exponent calculator 10 and cancellation detector 12 shown in FIG. 4A.

The selector 901 is controlled with the information on the differences in exponents calculated by the exponent calculator 900 and the information indicating whether or not the cancellation detector 603 has detected cancellation in the operations on two out of three terms. The selector 901 of maximum value, mantissa medium_man having the exponent of intermediate value and mantissa small_man having the exponent of minimum magnitude from the differences in exponents obtained from the exponent calculator 900 to their respective outputs, outputs the maximum exponent, intermediate exponent and the differences between the intermediate exponent and the minimum exponent (large_ex-small_ex, large_ex-medium_ex). Furthermore, when the cancellation detection circuit 903 detects that two out of three terms cancel out each other, the selector 901 outputs the mantissas of the two terms causing cancellation as 0 and outputs the exponent of the remaining one term as the intermediate exponent.

FIG. 11B shows a truth table indicating a relationship between inputs and outputs of the selector 901 provided with the above described function, but explanations of this truth table will be omitted.

The sign comparator 910 compares the signs of three terms and decides whether or not 2's complement should be taken for the mantissa of each term. Taking 2's complement requires the bits of the mantissa to be inverted and 1 to be added thereto. The process of adding 1 normally uses a carry-in of the least significant bit of an adder. In the case of input of three terms, this process of adding 1 is considered to be a burden, but a maximum of one term that takes 2's complement is enough and when two out of three terms become negative, it is preferable to take 2's complement for positive terms, carry out addition processing and then finally invert the sign of the result. Furthermore, when all the three terms are negative, it is preferable to carry out addition processing without taking any 2's complement for all the terms and then invert the sign of the result finally. By so doing, it is possible to reduce the process of adding 1 when taking 2's complement to a maximum of one time. The sign comparator 910 decides for which term 2's complement should be taken. The inverter 905, 906, 908 are controlled with the information on the decision result by the aforementioned sign comparator 910 and carry out bit inversion to take the complement of each mantissa.

The present invention can be incorporated in a microprocessor requiring floating-point operation and used for operations making heavy use of addition processing such as that described above and multiple-precision operations.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A three-term input floating-point adder-subtractor comprising:
cancellation detection means, including comparators and gate circuits, for detecting that two out of the three terms cancel out each other in an operation;
a selector for selectively outputting the three terms, wherein the two out of the three terms are output as zero when the cancellation detection means detects that the two terms cancel out each other;
shifters for making a digit adjusting shift with a width of 2n+3 bits on a mantissa of a first term having an exponent of intermediate value and a mantissa of a second term having minimum exponent in the three terms, where n is a bit width of a mantissa of each term, and, for each shifted mantissa, updating a respective least significant bit as a sticky bit with a corresponding logical combination of bits that overflowed the 2n+3 bit width by the respective digit adjusting shift;
an adder-subtractor for carrying out addition and subtraction on the three terms output by the selector having the 2n+3 bit width and outputting a result;
a normalizer for normalizing the result; and
a rounding circuit for carrying out rounding in a nearest value (RN) mode using an (n+3)th bit from a most significant bit of the result as a new sticky bit.

2. A three-term input floating-point adder-subtractor comprising:
cancellation detection means, including comparators and gate circuits, for detecting that two out of the three terms cancel out each other in an operation;
a selector for selectively outputting the three terms, wherein the two out of the three terms are output as zero when the cancellation detection means detects that the two terms cancel out each other;
shifters for making a digit adjusting shift with a width of 2n+4 bits on a mantissa of a first term having an exponent of intermediate value and a mantissa of a second term having minimum exponent in the three terms, where n is a bit width of a mantissa of each term, and, for each shifted mantissa, updating a respective least significant bit as a sticky bit with a corresponding logical combination of bits that overflowed the 2n+4 bit width by the respective digit adjusting shift;
bit discard detection means for detecting a case where two out of three terms produce bit discarded due to a shift resulting from the digit adjusting shift;
digit adjusting means for setting, when a bit discarded is detected from an output of the bit discard detection means, the amount of shift to n+4 for the mantissa having an exponent of intermediate value and to the sum of n+4 and a difference in exponents between the two terms for the mantissa having a minimum exponent;
an adder-subtractor for carrying out addition and subtraction on the three terms output by the selector having the 2n+4 bit width and outputting a result;
a normalizer for normalizing the result; and
a rounding circuit for normalizing the result and carrying out rounding in any one of rounding modes of nearest value (RN), zero direction (RZ), +infinity direction (RP), and −infinity direction (RM) modes using an (n+3)th bit from a most significant bit of the result as a new sticky bit.

3. A three-term input floating-point adder-subtractor comprising:
cancellation detection means, including comparators and gate circuits, for detecting that two out of the three terms cancel out each other in an operation;
a selector for selectively outputting the three terms, wherein the two out of the three terms are output as zero when the cancellation detection means detects that the two terms cancel out each other;
shifters for making a digit adjusting shift with a width of 2n+3 bits on a mantissa of a first term having an exponent of intermediate value and a mantissa of a second term having minimum exponent in the three terms, where n is a bit width of a mantissa of each term, and, for each shifted mantissa, updating a respective least significant bit as a sticky bit with a corresponding logical combination of bits that overflowed the 2n+3 bit width by the respective digit adjusting shift;
an adder-subtractor for carrying out addition and subtraction on the three terms output by the selector having the 2n+3 bit width and outputting a result;
a first rounding circuit for normalizing the result and carrying out rounding in any one of rounding modes of nearest value (RN), zero direction (RZ), +infinity direction (RP), and −infinity direction (RM) modes using an (n+3)th bit from the most significant bit of the result as a new sticky bit;

bit discard detection means including comparators which detects a case where two out of three terms produce bit are discarded due to a the digit adjusting shift;

magnitude relation detection means including comparators which detect, when a bit discarded is detected from the output of the bit discard detection means, a magnitude relation between absolute values of the two terms;

a sign determining circuit for determining a sign of the sum of the two terms;

a second rounding circuit for performing rounding in any one of rounding modes of nearest value (RN), zero direction (RZ), +infinity direction (RP), and −infinity direction (RM) modes; and a selector for selecting a result from the first and second rounding circuits.

4. A three-term input floating-point adder-subtractor comprising:

cancellation detection means, including comparators and gate circuits, for detecting that two out of the three terms cancel out each other in an operation;

a selector for selectively outputting the three terms, wherein the two out of the three terms are output as zero when the cancellation detection means detects that the two terms cancel out each other;

an operator for carrying out digit adjustment, addition and subtraction, and normalization, with a width of 2n+3 bits on mantissas of two out of the three terms having exponents smaller than the maximum exponent of the three terms, and outputting an intermediate result, where n is a bit width of a mantissa of each term, and carrying out digit adjustment and addition and subtraction with a width of 2n+3 bits on the intermediate result and the mantissa of the remaining one term without performing any rounding and outputting a result;

a normalizer for normalizing the result; and a rounding circuit for normalizing the result and performing rounding in any one of rounding modes of nearest value (RN), zero direction (RZ), +infinity direction (RP), and −infinity direction (RM) modes using an (n+3)th bit from a most significant bit of the result as a new sticky bit.

* * * * *